March 9, 1926.
J. D. EGGLESTON
MOTOR BUS
Filed Jan. 17, 1923
1,575,675
2 Sheets-Sheet 1
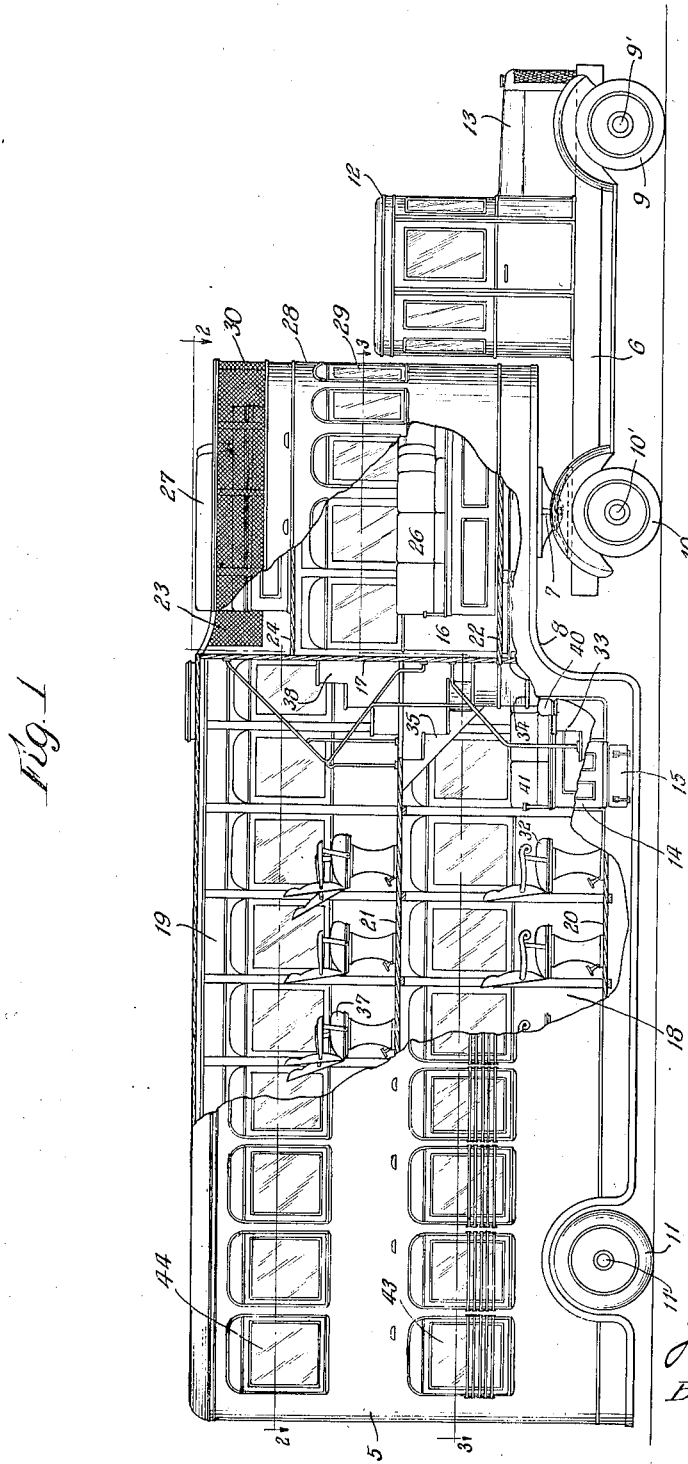

March 9, 1926.
J. D. EGGLESTON
MOTOR BUS
Filed Jan. 17, 1923
1,575,675
2 Sheets—Sheet 2
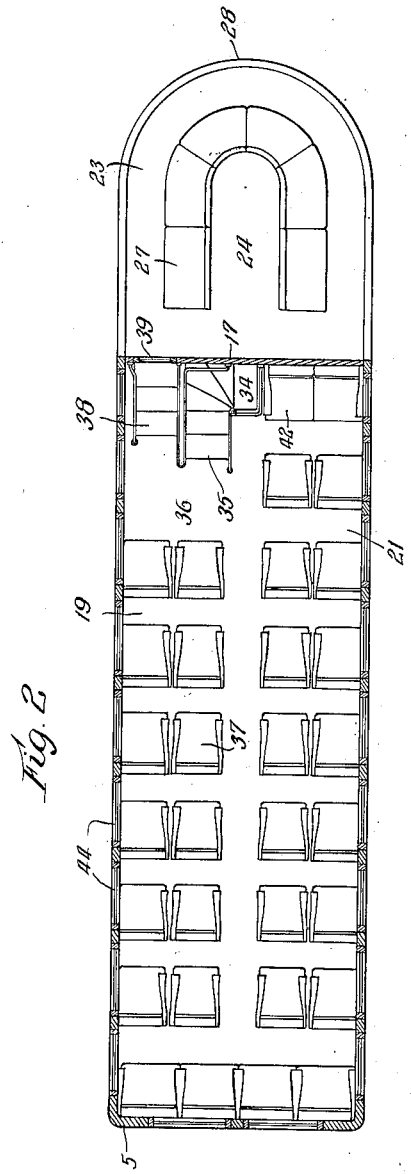
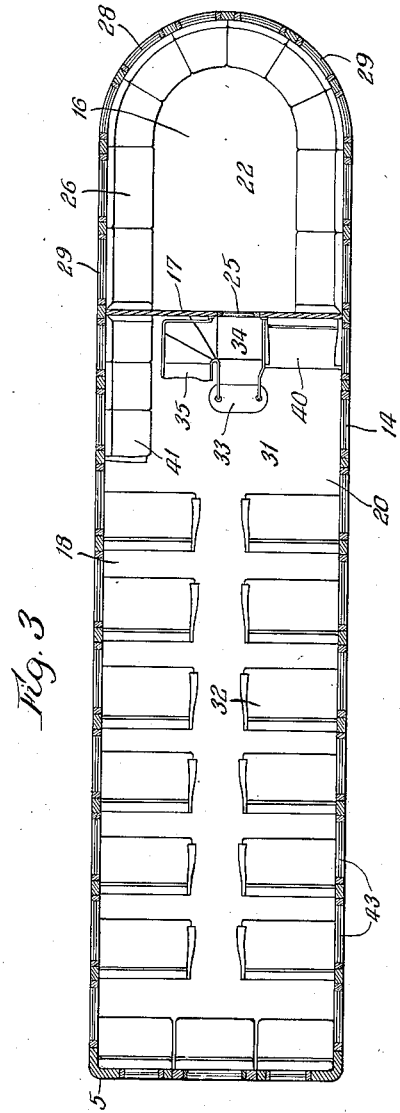
Inventor:
Jesse D. Eggleston
By: Wm. T. Belt
Atty.

Patented Mar. 9, 1926.

1,575,675

UNITED STATES PATENT OFFICE.

JESSE D. EGGLESTON, OF CHICAGO, ILLINOIS.

MOTOR BUS.

Application filed January 17, 1923. Serial No. 613,093.

*To all whom it may concern:*

Be it known that I, JESSE D. EGGLESTON, a citizen of the United States, residing at Chicago, in the county of Cook and State of Illinois, have invented certain new and useful Improvements in Motor Busses, of which the following is a specification.

The object of this invention is to provide a motor bus for passenger traffic which can be easily maneuvered in city streets and suburban and country roads, which will afford maximum comfort and ease to the passengers, and which can be operated and maintained economically.

The demand for passenger transportation by motor bus is steadily growing because of the great convenience afforded thereby to travelers, the extensive work done in laying good roads suitable for such travel, and the economy of operation, and this demand exists not only for city and suburban service, but between cities and to trips of greater or less length.

The use of motor busses for sight seeing purposes and for general passenger transportation has existed for some time, principally in the larger cities. But the industry is comparatively new and not sufficient consideration has been given to the convenience and comfort of the passengers or to the facility of handling or the cost of operating and maintaining them.

It has been customary heretofore to construct the bus as a single structure with the passenger compartment and the motor combined in one single unit supported upon four carrying wheels over which the combined load is unevenly distributed. This sort of structure is not capable of being made comfortable for the passengers because they are subjected to all the shocks and jars incident to the operation of the motor, the shifting of gears, the application of brakes and the twists and turns necessary to guide the vehicle. Furthermore, the presence of the motor in the same structure with the passenger compartment inevitably results in subjecting the passengers to the obnoxious odors of imperfect combustion in the motor. After a considerable study of existing conditions I have found that while motor bus transportation is highly desirable and now very greatly demanded, the busses conmmonly employed for this purpose are open to a greater or less extent to the objections heretofore mentioned and to many others; and it is my object to improve the conditions by providing a motor bus which will, so far as possible, avoid the objectionable conditions now existing and provide a motor bus which will give comfortable transportation to the passengers, as well as being easy to enter and leave, which will be free from the ordinary vibrations incident to the use of a motor as a power medium, which is capable of making a sharp corner turn and of turning completely around in a city street even when built of comparatively large capacity, and which is low hung to avoid possibility of overturning.

The invention has other objects in view which will be pointed out hereinafter in the description of a selected embodiment of the invention illustrated in the accompanying drawings, in which—

Fig. 1 is a side elevation, partly broken away and partly in section illustrating the invention.

Figs. 2 and 3 are horizontal sectional views on the lines 2—2 and 3—3 respectively of Fig. 1.

Referring to the drawings, 5 designates generally the body of the bus or the compartment unit and 6 is the tractor or motor unit, the front end portion of the body unit and the rear end portion of the motor unit being connected at 7 so that the motor unit may turn in an arc of 180° or more relative to the body unit. The forward part of the body is recessed at 8 to receive the rear end portion of the motor unit which projects under and supports the front end portion of the body unit. The motor unit is carried on two front steering wheels 9 and two rear driving wheels 10, as is customary in motor driven vehicles, and the rear end of the body is carried on two wheels 11. Thus the load is distributed over six wheels which are mounted on three axles 9', 10' and 11', and I prefer that the four wheels 10 and 11 should be wide tired wheels. I estimate that, generally speaking, 45% of the load is carried on the wheels 11 of the body unit or trailer, 45% on the traction wheels 10, and 10% on the front wheels 9, whereby the load is most conveniently and satisfactorily distributed for transportation purposes and in a manner which facilitates steering the vehicle. The motor unit is provided with a cab 12 for the driver and this cab is located just in front of the front end of the trailer. A suitable motor is, of course, provided beneath the hood 13.

The body unit or trailer may be made in many different ways, but I have found the construction illustrated in the drawings not only suitable, but presenting many practical advantages, and for that reason I have selected this embodiment for illustration. The body is provided with a side door 14 and a folding step 15 which can be automatically operated, if desired, after the manner of operating some street-car doors and steps at the present time. I prefer to locate this door on the right hand side closely adjacent to the front compartment 16 of the body which is defined generally by the recessed portion 8, and is separated by a transverse partition 17 from the main passenger compartments 18, 19, located upon the lower deck 20 and the upper deck 21. I have provided but one enclosed compartment at the front of the trailer unit on the deck 22, and I have utilized the space afforded above this enclosed compartment to provide what I may term an open compartment 23 on a deck 24, which forms a ceiling for the compartment 16. The partition 17 may be provided with a door 25 of any suitable description, or with a portiere as desired, and the compartment 16 may be used as a smoking room. Seats 26 may be arranged around the outside wall of the compartment 16, as shown in Fig. 3, or the seats may be arranged to face the outside wall as the seats 27 are shown in the open compartment 23. The front end of the trailer unit is curved or rounded as shown at 28, and the outside wall of the compartment 16 is provided with a plurality of windows 29 which are arranged most satisfactorily for observing the scenery. The top of the cab 12 is sufficiently low so as not to obscure the view from the front windows in the compartment 16. The open or observation compartment 23 is surrounded by a wall 30 of sufficient height to protect the passengers occupying the compartment and this wall is preferably made of wire mesh.

Within the lower compartment 18 I provide an open space 31 (Fig. 3) adjacent the door 14 for the passage of passengers to and from the seats 32 on the lower deck and to and from the stairway leading to the compartments 16, 19 and 23. This stairway comprises a flight of steps 33 preferably located about midway between the sides of the body or trailer unit and rising in a forwardly direction thereof to a platform 34 in front of the doorway 25 leading to the compartment 16. Then a flight of steps 35 with a turn at the bottom thereof rises rearwardly from the platform 34 to an open space 36 on the upper deck 21 (Fig. 2) to lead to the seats 37 in the upper compartment 19. Another flight of steps 38 rises forwardly from the open space 36 to the deck 24 through a doorway 39 which, like the doorway 25, may be equipped with a door of any suitable description or with suitable hangings. This stairway, comprising the flights 33, 35 and 38 combined with the platform 34 and the deck spaces 31, 36, provides a compact and convenient arrangement for the movement of passengers to and from the several compartments. The conductor may be stationed on the deck space 31 where he can give close attention to the door 14 and to the passengers entering and leaving the bus, and general attention to all of the compartments and the passengers therein. The seats 32 and 37 may be variously constructed as desired and so may the seats 40, 41 and 42, which are disposed on the decks 18 and 19 adjacent the stairway. Windows 43 are provided for the compartment 18 and windows 44 for the compartment 19.

My invention provides a bus with a plurality of compartments conveniently arranged and easily accessible so that passengers may have a choice of sitting forward in an inclosed smoking compartment or on an open deck, or in the more commodious rear compartments on the lower and upper decks. The stairway is constructed, located and arranged to give convenient access to the various compartments with the greatest convenience to the passengers; the compartments are commodious and are capable of being furnished with seats constructed and disposed to promote comfort to the passengers. The disposition of the passengers in a semi-trailer unit, which is hitched to a motor unit but otherwise not connected therewith is particularly important because it enables the provision of convenient and commodious passenger compartments, it promotes the comfort of the passengers and it promotes economy of operation. The four wheels 10 and 11 are preferably wide tired and the load of the complete bus is distributed most efficiently for economical operation. The drop frame construction of the body is preferably mounted on a drop axle 11' so that the level of the deck 20 is located close to the ground, whereby passengers can easily enter and leave the bus with or without using the step 15.

My improved bus may be made of much larger capacity per motor horse power than has been customary heretofore because the weight is distributed in a manner which will enable the motor to operate with greater efficiency. The passengers are relieved from the annoyance of noises and vibrations produced by the motor and from shifting of gears, applying brakes, starting and stopping the bus, etc. because the passengers are carried in the trailer unit which is separate from the motor unit. The trailer unit is carried on a three-point suspension and hence the shocks and vibrations of traveling over rough roads which are experienced in the ordinary four-wheeled vehicle having the motor therein are greatly minimized and almost entirely avoided in my improved bus. The overlapping arrangement of the forward end of the trailer unit and the rear end of the power unit provides great flexibility of operation and enables the bus to be turned in a comparatively short radius so that it can be easily maneuvered through crowded city streets.

My improved bus can be variously equipped for short haul or for long haul service; its several compartments can be differently equipped to suit the varied tastes of passengers; and the seating arrangement may be changed in various ways as may be found most suitable and agreeable for the service for which the bus is designed.

It is of the highest importance that a motor bus should be comfortable to passenger in entering and leaving the bus, and while riding therein; that the bus should be built and equipped for safety in travel and ease of operation; and that the cost of construction and of operation should be economical. I believe that my improved bus achieves these objects in a higher degree than has ever before been accomplished so that this desirable mode of travel can be promoted with profit to the traveling public, as well as to those providing the service.

I have shown the invention embodied in a two-deck passenger bus also having a separate forward compartment and an open compartment thereover, but it will be understood that the invention can be embodied in a single deck bus and the partition 17 may be omitted, if desired. Any one or all of the compartments may be equipped for carrying baggage or goods instead of or together with passengers, if desired.

It may be necessary or desirable to make various changes in the form, construction and arrangement of parts in adapting my invention to busses of different capacities, and for different kinds of service, and for other reasons, and therefore I reserve the right to make all such changes as fairly fall within the scope of the following claims:—

I claim:

1. A motor bus comprising a compartment unit having lower and upper rear compartment decks, a forward compartment deck in a plane intermediate of the rear compartment decks, an upper forward compartment deck above the plane of the upper rear compartment deck, a door for the lower rear compartment, and a stairway rising forwardly from the lower rear compartment deck to the level of the lower forward compartment deck and thence rising rearwardly to the upper rear compartment deck and thence rising forwardly to the upper forward compartment deck.

2. A motor bus comprising a compartment unit having a lower rear compartment deck close to the ground, an upper rear compartment deck forming a ceiling for the lower rear compartment, a forward compartment deck located in a plane between the rear compartment decks, an open compartment deck forming a ceiling for the forward compartment, a transverse partition located between the rear compartments and the forward and open compartments, doorways in said partition to said forward compartment and to said open compartment, a doorway for the lower rear compartment, and a stairway rising from said lower rear compartment deck to said forward compartment deck and thence to said upper rear compartment deck and thence to said open compartment deck.

3. A motor bus comprising a power unit and a body unit, a transverse partition dividing the body unit into a rear portion and a front portion and the front portion being arranged to rest upon the power unit, upper and lower passenger compartments in the rear portion of the body unit, and upper and lower passenger compartments in the front portion of the body unit.

4. A motor bus comprising a power unit and a compartment unit, the latter having a closed compartment resting on the power unit, closed upper and lower compartments communicating with said first named compartment, and an open compartment communicating with one of the closed compartments.

5. A motor bus comprising a power unit and a compartment unit, the latter having a closed compartment resting on the power unit, an open compartment on top of said first named compartment, and closed upper and lower compartments communicating with either of said two first named compartments.

JESSE D. EGGLESTON.